US006996178B1

(12) United States Patent
Zhang et al.

(10) Patent No.: US 6,996,178 B1
(45) Date of Patent: Feb. 7, 2006

(54) LOOK AHEAD MOTION COMPENSATION

(75) Inventors: Ji Zhang, San Jose, CA (US); Hain-Ching Liu, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 361 days.

(21) Appl. No.: 09/682,385

(22) Filed: Aug. 27, 2001

(51) Int. Cl.
*H04B 1/66* (2006.01)
(52) U.S. Cl. ................................. 375/240.16
(58) Field of Classification Search ........... 375/240.01, 375/240.02, 240.03, 240.09, 240.11, 240.12, 375/240.25, 240.26, 240.16, 240.15, 240.13; 382/238, 236; 709/247; 345/544, 531; 348/407.1; H04B 1/66
See application file for complete search history.

(56) References Cited

U.S. PATENT DOCUMENTS

| | | | | |
|---|---|---|---|---|
| 5,812,791 A | * | 9/1998 | Wasserman et al. ........ 709/247 |
| 5,912,676 A | * | 6/1999 | Malladi et al. ............. 345/531 |
| 5,978,509 A | * | 11/1999 | Nachtergaele et al. ...... 382/236 |
| 5,990,958 A | * | 11/1999 | Bheda et al. ............. 348/407.1 |
| 6,005,624 A | * | 12/1999 | Vainsencher ........... 375/240.14 |
| 6,028,612 A | * | 2/2000 | Balakrishnan et al. ...... 345/544 |
| 6,084,637 A | * | 7/2000 | Oku et al. .................. 348/445 |
| 6,094,457 A | | 7/2000 | Linzer et al. |
| 6,141,447 A | | 10/2000 | Linzer et al. |
| 6,181,711 B1 | | 1/2001 | Zhang et al. |
| 6,192,083 B1 | | 2/2001 | Linzer et al. |
| 6,385,248 B1 | * | 5/2002 | Pearlstein et al. ...... 375/240.25 |
| 6,415,056 B1 | * | 7/2002 | Boon ......................... 382/238 |
| 6,490,324 B1 | * | 12/2002 | McDade et al. ....... 375/240.25 |
| 6,618,440 B1 | * | 9/2003 | Taunton ................. 375/240.16 |

OTHER PUBLICATIONS

Zhang, Ji and Liu, Hain-Ching, "Methods and Apparatus for Bandwidth Scalable Transmission of Compressed Video Data Through Resolution Conversion", U.S. Appl. No. 60/150,239, filed on Jun. 30, 2000, 52 pages.

Zhang, Ji; Liu, Hain-Ching and Ding, Jiangang, "Efficient Methods of Performing Motion Compensation Based Decoding and Recoding of Compressed Video Bitstreams", U.S. Appl. No. 09/915,697, filed on Jul. 25, 2001, 37 pages.

* cited by examiner

*Primary Examiner*—Tung Vo
(74) *Attorney, Agent, or Firm*—Beyer Weaver & Thomas, LLP

(57) ABSTRACT

Efficient methods for performing motion compensation are described. The methods are particularly useful during motion compensation based decoding and recoding. In one aspect, the look ahead motion compensation methods obtain motion vector information for a macroblock being reconstructed in advance of motion compensation of the macroblock. The information is then converted into memory transfer instruction; that can be used to perform transferring of reference image data in advance of the motion compensation operations. A reference sub-region needed for motion compensation, as identified by the motion vector, is then obtained in advance of motion compensation of the macroblock.

50 Claims, 8 Drawing Sheets

LOOK AHEAD MOTION COMPENSATION

BACKGROUND OF INVENTION

The present invention relates generally to systems and methods for processing video data. More specifically, the present invention relates to efficient systems and methods for performing motion compensation based decoding and recoding.

Video data is transmitted in a bitstream, or a continuous sequence of binary bits used to digitally represent compressed video, audio or data. The bitstream is transmitted over a transmission channel. One problem with existing transmission channels is their ability to transport video data. In multimedia streaming applications for example, the video data requires significant bandwidth from a communication channel. Since transmission of video data with existing communication channels is often excessive, compression is an approach that has been used to make digital video images more transportable. Digital video compression schemes allow digitized video frames to be represented digitally in much more efficient manner. Compression of digital video makes it practical to transmit the compressed signal using digital channels at a fraction of the bandwidth required to transmit the original signal before compression.

International standards have been created for video compression schemes. These include MPEG-1, MPEG-2, MPEG-4, H.261, H.262, H.263, H.263+, etc. These standardized compression schemes rely on several algorithm schemes such as motion compensation, transform coding (for example, DCT transforms or wavelet/sub-band transforms), quantization of the transform coefficients, and variable length coding (VLC).

Motion compensation removes the temporally redundant information between video frame sequences. Motion compensation of an MPEG compressed bitstream includes an iterative process where I, P and B frames are reconstructed using a reference framestore memory, or frame buffer. The framestore memory contains reconstructed image samples from the input compressed bitstream. In most cases, on-chip memory is insufficient to hold the video data for an entire reference frame. With an HDTV signal for example, the framestore memory may need up to 12 MB of memory if an entire frame is used for motion compensation. Thus, the framestore memory or frame buffer is typically an off-chip memory source. Using off-chip memory may dramatically slow down motion compensation of compressed video.

More specifically, motion compensation for a block is a three-step process. The first step is to retrieve a reference block of pixel values from the reference framestore memory and to retrieve a block of pixel values just decoded from a decoded framestore memory. The second step is to perform motion compensation, which includes a summation of all pixel values for the block. The last step is to move the summed block back to the decoded framestore memory. This three-step process is performed in sequence for each block in a macroblock before selecting and processing the next macroblock in a frame.

The sequential and repetitive nature of block transfers from the framestore memories produces significant delay. Video typically includes more than a thousand of frames per minute, and more than a thousand blocks per frame. This delay may compromise timely transmission and decoding of video data. For example, transmission of video data is often intended for real-time playback. This implies that all of the information required to represent a digital picture must be delivered and displayed in a timely manner. Thus, motion compensation applied during decoding or recoding must be performed quickly. In a digital video broadcast where thousands of bitstreams are transmitted for example, undesirable processing delays may compromise broadcast transmission.

Therefore, there is a need for efficient methods and systems of performing motion compensation without incurring undesirable delays.

SUMMARY OF INVENTION

The present invention provides efficient methods for performing motion compensation. The methods are particularly useful during motion compensation based decoding and recoding.

In one aspect, the present invention relates to a method for processing a compressed bitstream comprising video data. The method comprises parsing a portion of the compressed bitstream before motion compensation on video data included in the portion. The method also comprises obtaining motion information related to the video data. The motion information comprises a set of motion vectors. The method further comprises storing a reference sub-region identified by the motion information in a first memory before performing motion compensation using the set of motion vectors. The method additionally comprises performing motion compensation on the video data using the reference sub-region stored on the first memory.

In another aspect, the present invention relates to a method for processing a compressed bitstream comprising video data. The method comprises parsing a portion of the compressed bitstream before motion compensation on video data included in the portion. The method also comprises obtaining motion information related to the video data. The motion information comprises a set of motion vectors. The motion information references a reference window sub-region in a set of reference window sub-regions. The method further comprises storing the set of reference window sub-regions included in a reference window in a first memory before motion compensation using the set of motion vectors. The method additionally comprises performing motion compensation on the video data using the reference sub-region stored on the first memory.

In yet another aspect, the present invention relates to a system for processing a compressed bitstream comprising video data. The system comprises means for parsing a portion of the compressed bitstream before motion compensation on video data included in the portion. The system also comprises means for obtaining motion information related to the video data. The motion information comprises a set of motion vectors. The system further comprises means for storing a reference sub-region identified by the motion information in a first memory before performing motion compensation using the set of motion vectors. The system additionally comprises means for performing motion compensation on the video data using the reference sub-region stored on the first memory.

In yet another aspect, the present invention relates to a computer readable medium including instructions for processing a compressed bitstream comprising video data. The instructions comprise instructions for parsing a portion of the compressed bitstream before motion compensation on video data included in the portion. The instructions also comprise instructions for obtaining motion information related to the video data. The motion information comprises a set of motion vectors. The instructions further comprise instructions for storing a reference sub-region identified by the motion information in a first memory before performing motion compensation using the set of motion vectors. The instructions additionally comprise instructions for performing motion compensation on the video data using the reference sub-region stored on the first memory.

These and other features and advantages of the present invention will be described in the following description of the invention and associated Figures.

BRIEF DESCRIPTION OF DRAWINGS

The present invention is illustrated by way of example, and not by way of limitation, in the figures of the accompanying drawings and in which like reference numerals refer to similar elements and in which.

DETAILED DESCRIPTION

Figure 1A:
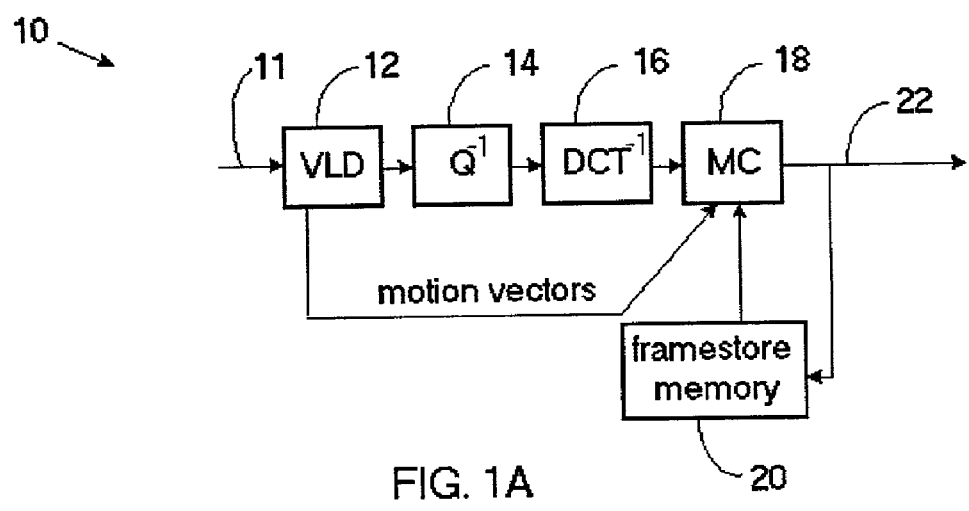
FIG. 1A illustrates a conventional process flow to decode video data.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In some instances, well known process steps and/or structures have not been described in detail in order to not unnecessarily obscure the present invention.

1. Overview

The present invention provides systems and methods for recoding and decoding video data in a compressed bitstream. In one aspect, the present invention increases processing speed of motion compensation during recoding or decoding. Upon receiving a compressed bitstream, the look ahead motion compensation methods described herein parse the bitstream and extract motion information. The motion information comprises one or more motion vectors for a macroblock to be reconstructed. A reference sub-region needed for motion compensation, as identified by the motion vector(s), is obtained in advance of motion compensation of the macroblock. According to one embodiment, the reference sub-region is stored in on-chip memory prior to motion compensation of the macroblock. Obtaining and storing multiple reference sub-regions in advance of motion compensation in this manner allows motion compensation to proceed without continuous data access delays.

2. Decoding and Encoding

The present invention describes efficient decoding and recoding methods applied onto compressed bitstreams including video data. Although the remaining discussion will focus primarily on processing of an MPEG-2 bitstream, the present invention is not limited to processing an MPEG bitstream, or any other specific compression format. The methods described herein may be implemented in any public or proprietary compression format including motion compensation as an encoding or re-encoding step. Examples of such compression formats include MPEG-1, MPEG-2, MPEG-4, H.261, H.262, H.263, H.263+, Microsoft streaming format, QuickTime, and Real Networks.

The MPEG-2 compression standard consists of two layers: a system layer an elementary stream layer. The system layer is defined to allow an MPEG-2 decoder to correctly decode audio and video data, and present the decoded result to the video screen in time continuous manner. The elementary stream layer typically contains the coded video and audio data. It also defines how compressed video (or audio) data are sampled, motion compensated (for video), transform coded, quantized and represented by different variable length coding (VLC) tables.

In the elementary stream, the basic structure for a coded video picture data is a block that comprises an 8 pixel by 8 pixel array. Multiple blocks form a macroblock, which in turn forms part of a slice. A coded picture consists of multiple slices. Multiple coded pictures form a group of pictures. Such hierarchical layering of data structures localizes the most basic processing on the lowest layer, namely blocks and macroblocks. In one embodiment, processing in accordance with the present invention occurs on this lowest level. For example, motion compensation of a compressed MPEG-2 bitstream is a process that occurs on the macroblock level. The access unit level information relates to coded pictures and may specify whether a picture is an intra frame (I frame), a predicted frame (P frame), or a bidirectional frame (B frame). An I frame contains full picture information. A P frame is constructed using a past I frame or P frame. A bi-directional frame (B frame) is bi-directionally constructed using both a past and a future I or P frame, which are also called anchor frames.

For typical B or P frame macroblocks, each macroblock contains a set of motion vectors. The number of motion vectors depends on the type of macroblock and the type of coded picture. At a minimum, each macroblock has one (x,y) motion vector. At a maximum, each macroblock may have four motion vectors, one for forward prediction, one for backward prediction, each for both top and bottom fields. Thus, a set of motion vectors is associated with a macroblock. The structure of the MPEG standard is well known to one of skill in the art and described by the MPEG standards. The present invention is suitable for use with the MPEG-1 specification, described in ISO/IEC International Standard 11172; "Coding of moving pictures and associated audio for digital storage media up to about 1.5 Mbits/s", November 1993, which is herein incorporated by reference. The present invention is also suitable for use with the MPEG-2 specification, described in ISO/IEC International Standard 13818; "Generic coding of moving pictures and associated audio information", November 1994, which is herein incorporated by reference. The present invention is also suitable for use with the MPEG-4 specification, described in ISO/IEC International Standard; Coding of moving pictures and associated audio information", March 2000, which is herein incorporated by reference.

Methods and apparatus of the present invention are suitable for use during decoding of compressed video data. Decoding of a bitstream refers to the process of converting compressed video data to a displayable output. Recoding of a compressed video bitstream refers to a process performed on a compressed video bitstream that results in a different bit usage than the originally compressed bitstream, and may include partial or full decoding and re-encoding. FIG. 1A illustrates an exemplary process flow 10 to decode compressed video data. The process flow 10 may take place in a network device such as the network device of FIG. 7.

Process flow 10 begins by receiving an MPEG compressed bitstream including video data 11. The video data is decoded using variable length decoding 12, de-quantization 14, inverse transform coding 16 and motion compensation 18. Motion compensation 18 includes an iterative process where I, P and B frames are reconstructed using a framestore memory 20. The result of process flow 10 is de-compressed video data 22.

Figure 1B:
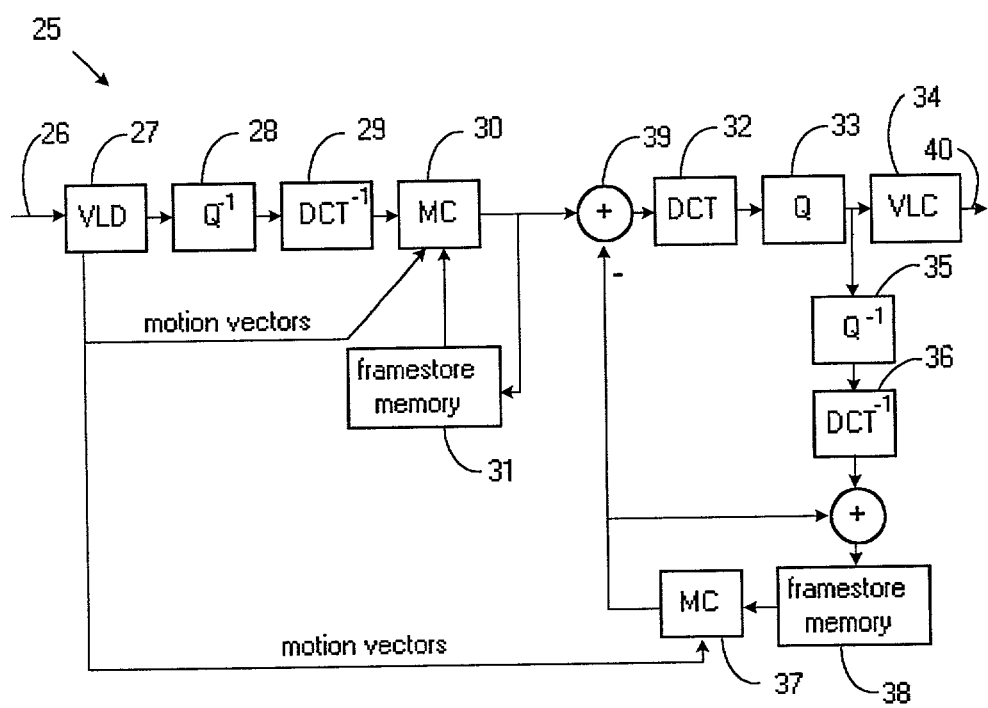
FIG. 1B illustrates an exemplary process flow to recode video data using motion compensation based recoding of the residual error between frames.

FIG. 1B illustrates an exemplary process flow 25 to recode video data using motion compensation based recoding of residual error between frames. The process flow 25 may take place in a network device such as the network device of FIG. 7.

Process flow 25 begins by receiving a compressed bitstream including video data 26. Similar to FIG. 1A, the video data 26 is decoded using variable length decoding 27, de-quantization 28, inverse transform coding 29 and motion compensation 30 using framestore memory 31. The resulting decoded video data is then re-encoded. Re-encoding includes processing the video data with transform coding 32, re-quantization 33, and VLC encoding 34.

After transform coding 32 and re-quantization 33, each image (full image in the case of I pictures, motion residential in cases of P or B pictures) is reconstructed comprising de-quantization 35 and inverse transform coding 36 before motion compensation 37. Motion compensation 37 includes an iterative process where I, P and B frames are reconstructed using a framestore memory 38. Motion compensation 37 produces a predicted picture that is subtracted 39 with the next decoded picture and residual error sent with the compressed bitstream. The result is then encoded by transform coding 32, re-quantization 33, and VLC encoding 34. The recoded compressed video data 40 may then be transmitted or stored.

Recoding process flow 25 may produce compressed video data 40 having a lower bit rate than received 26. There are numerous bit rate techniques suitable for reducing the bit rate of video data. For example, re-quantization 33 may performed with a larger quantization step value. Alternatively, the present invention may perform rate conversion and control by adjusting the resolution of the video data. Resolution alteration of the video data may include complete decoding to a raw video image before encoding back into a compressed bitstream. For example, framestore memory 38 may store images while motion vectors are generated. Resolution conversion according to another bit rate alteration scheme suitable for use with the present invention is described in commonly-owned U.S. patent application Ser. No. 09/608,128, which is incorporated by reference herein for all purposes. Other suitable recoding techniques are described in commonly-owned U.S. Pat. No. 6,181,711 B1, which is incorporated by reference herein for all purposes.

Although the present invention will now be discussed with respect to several specific recoding techniques, the present invention generally applies to any motion compensation, whether performed in an encoder, decoder, or re-encoder. In a specific embodiment, the methods described herein perform motion compensation using a single framestore that stores the recoding errors.

2. Exemplary Decoding and Encoding Apparatus

Figure 2:
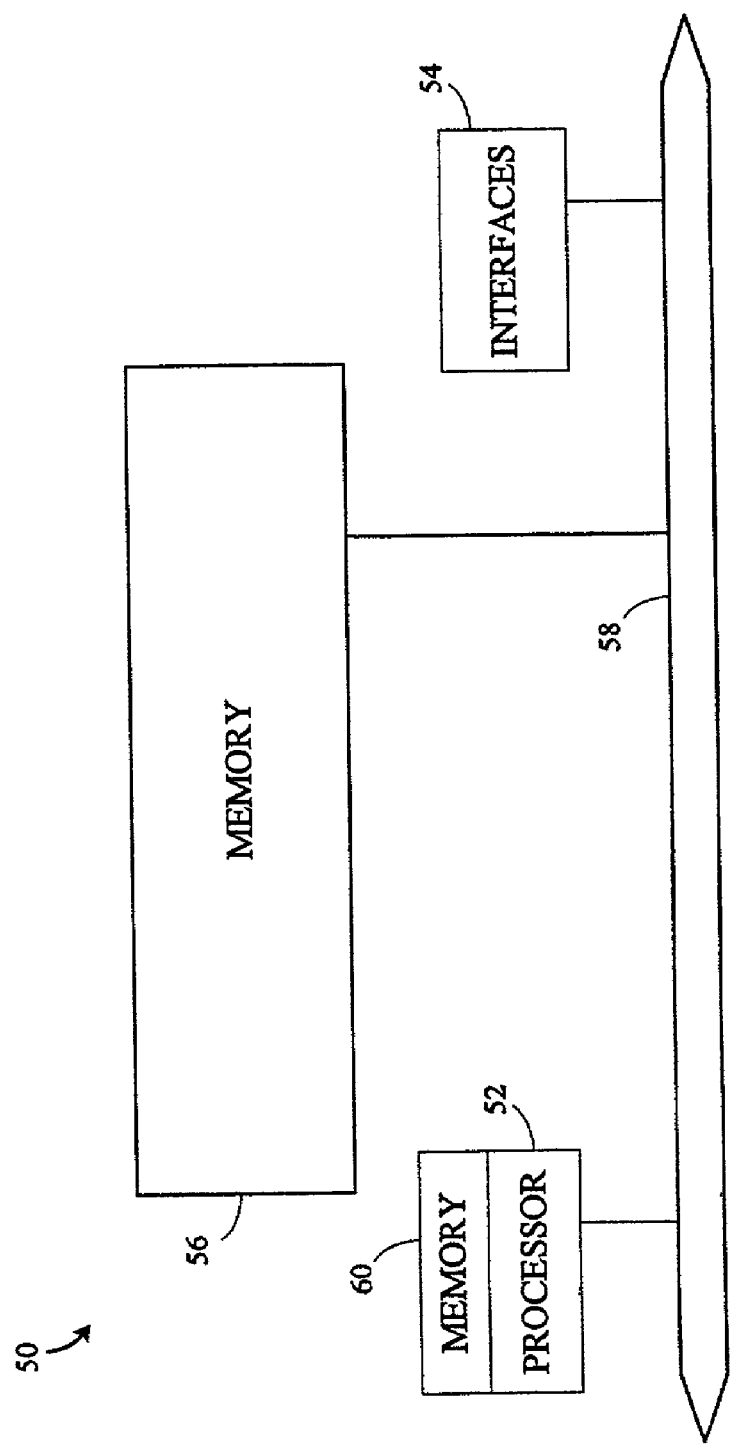
FIG. 2 illustrates a simplified general purpose system to help illustrate certain aspects of the present invention.

Referring now to FIG. 2, a simplified general purpose system 50 is shown to help illustrate one aspect of the present invention. System 50 includes a general architecture for performing motion compensation and comprises a processor (CPU) 52, interfaces 54, memory 56, and a bus 58 (e.g., a PCI bus). Interfaces 54 control the sending and receiving of data packets over a network in communication with system 50 and may support other peripherals used with system 50. A memory 60 (such as non-volatile RAM and/or ROM) also forms part of processor 52. Memory 56 is larger than memory 60 and acts as the main memory for system 50. Memory 60 may be accessed relatively quickly by processor 52. Conversely, processor 52 communicates with off-chip memory 56 via bus 58, which is relatively slow compared to that of memory 60. For the remainder of the discussion, memory 60 is referred to herein as "on-chip" memory while memory 56 is referred to herein as "off-chip" memory. However, there are many different ways in which memory could be configured within system 50.

3. Efficient Motion Compensation

As on-chip memory is often insufficient to store the video data for an entire video frame, and off-chip memory usage often incurs undesirably delays, methods are provided for performing motion compensation without incurring processing associated with off-chip memory during motion compensation. Motion compensation in this manner may significantly improve motion compensation processing speed and increase the speed of decoding and recoding compressed video.

Figure 3:
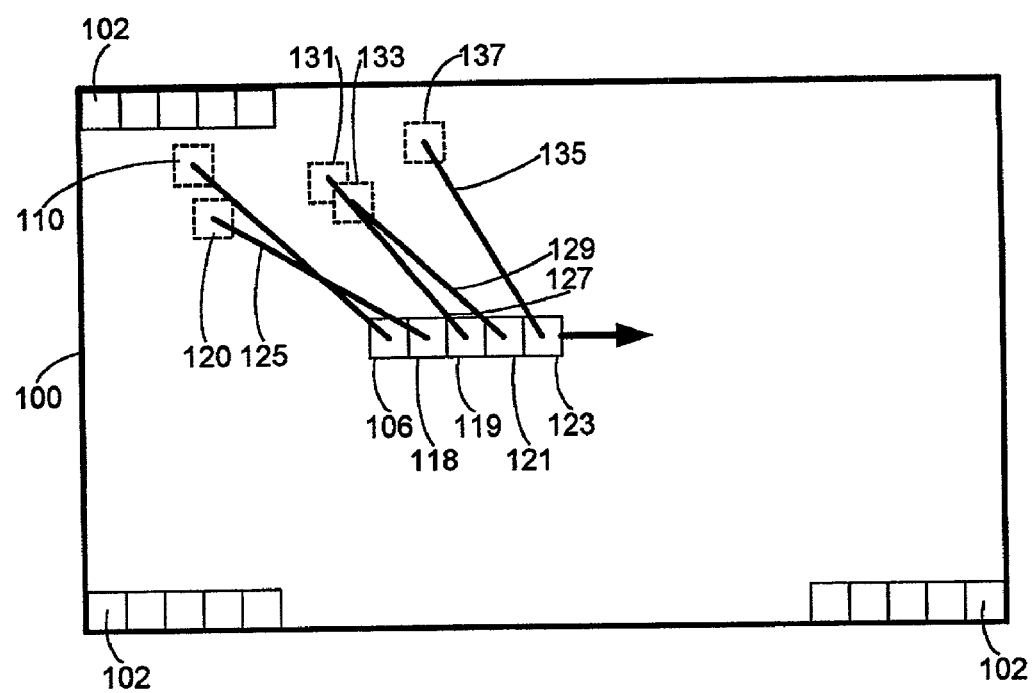
FIG. 3 illustrates a frame being recoded or decoded in accordance with one embodiment of the present invention.

FIG. 3 illustrates a frame 100 being recoded or decoded in accordance with one embodiment of the present invention. Frame 100 is compressed according to MPEG-2 compression and comprises macroblocks 102. Motion compensation of macroblocks 102 occurs in raster order. Thus, macroblocks 102 in the upper left corner of frame 100 are first processed. Motion compensation then continues from left to right across frame 100 for each row of macroblocks 102, and continues in descending rows, finishing with the macroblock 102 in the lower right corner of frame 100.

Motion compensation for macroblocks 102 of frame 100 is a process that uses one or more motion vectors for each macroblock 102 and a reference image sub-region. A motion vector describes the spatial offsets between the macroblock being reconstructed and the reference sub-region. The reference sub-region includes video data used, together with the motion residual data contained in the macroblock data, in re-constructing a macroblock 102. The reference sub-region is located in a reference image frame buffer identified by the motion vector. In one embodiment, the reference sub-region has the same dimensions of a referencing macroblock, however, the sub-region typically may not align with the macroblock boundaries in a frame, which are at fixed location for a given image resolution. The reference sub-region is typically included in a reference frame. For example, the reference frame may be an I frame and/or P frame, based on the position of frame 100 within a Group of Pictures in an MPEG bitstream. The reference frame is stored in memory and was previously constructed, or in the case of an I frame, contains full picture information. Thus, the reference frame includes the reference sub-region identified by motion vectors of the current frame being reconstructed.

As illustrated in FIG. 3A, macroblock 106 is currently being reconstructed using motion compensation. Motion vector 108 identifies reference sub-region 110 for macroblock 106. Reference sub-region 110 is included in a reference frame previously constructed, and comprises video data used in re-constructing macroblock 106.

Following in raster order, macroblocks 118, 119, 121 and 123 are to be processed after macroblock 106. The look ahead motion compensation methods of the present invention obtain motion vectors 125, 127, 129, and 135, respectively, for macroblocks 118, 119, 121 and 123 in advance of motion compensation processing of the referencing macroblocks. Motion vectors 125, 127, 129, and 135 identify reference sub-regions 120, 131, 133, and 137, which are needed to perform motion compensation. The look ahead motion compensation methods of the present invention also obtain reference sub-regions 120, 131, 133, and 137 in advance of motion compensation processing of their referencing macroblocks 118, 119, 121 and 123. In one embodiment, reference sub-regions 120, 131, 133, and 137 are stored in on-chip memory just prior to motion compensation of the referencing macroblocks.

As motion compensation processing continues to macroblocks 118, 119, 121 and 123, only on-chip memory access is required for motion compensation without incurring delays in accessing and obtaining data from off-chip memory sources. For example, motion vector 125 for macroblock 118 identifies reference sub-region 120, which is also stored in on-chip memory prior to motion compensation using motion vector 125. Similarly, motion vectors 127 and 129 identify reference window sub-regions 131 and 133 for macroblocks 119 and 121.

Figure 4:
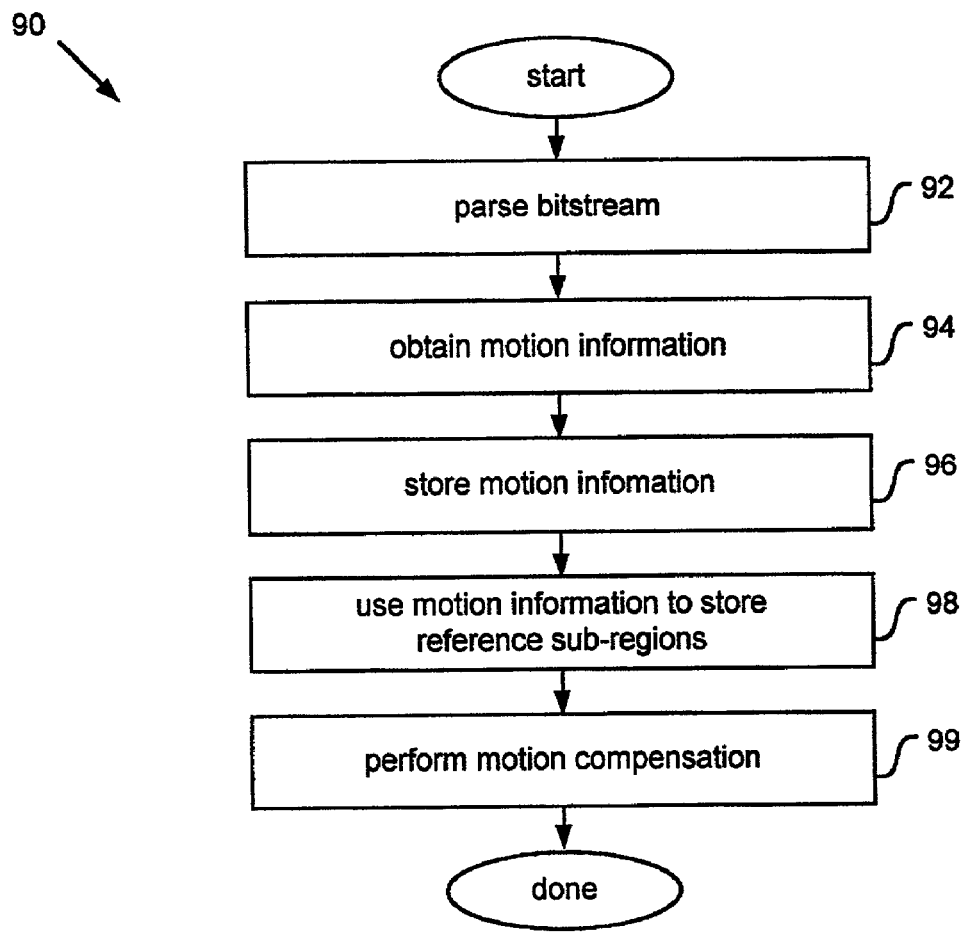
FIG. 4 illustrates a process flow for look ahead motion compensation processing in accordance with one embodiment of the present invention.

FIG. 4 illustrates a process flow 90 for look ahead motion compensation processing in accordance with one embodiment of the present invention. Process flow 90 may take place in any network device such as the network device 700 of FIG. 7. Processes in accordance with the present invention may include up to several additional steps not described or illustrated here in order not to obscure the present invention. While compressed video bitstream processing will now be described as a method, those skilled in the area will recognize that the present invention encompasses a system or software having units capable of performing the actions as described below.

Process flow 90 begins by receiving a compressed bitstream and parsing a portion of the bitstream (92). Parsing is typically performed in conventional processing of compressed bitstreams to obtain statistical data relating to the profile of the video data being processed, such as the number of bits per coded picture in the compressed bitstream, coded picture type, sum of the quantization scale values, etc. The present invention, however, modifies the parsing to additionally locate motion information that is useful to subsequent motion compensation.

The motion information is also obtained from the portion of the compressed bitstream that it is stored in (94). In one embodiment, the motion information comprises one or more motion vectors for each macroblock in a frame being reconstructed. The motion vectors are extracted by decoding them from their location in the compressed bitstream. For an MPEG bitstream, the motion vectors are coded as variable length codes and embedded at the macroblock data level just before the macroblock mode and transform coefficient data portion. Each motion vector identifies a reference sub-region or portion from a reference frame that contains video data used in motion compensation of a macroblock being processed. This reference sub-region is located in memory using the motion vector.

The motion information parameters may also comprise, for example, x and y direction motion vector offset (coded as VLC in the bitstream), motion vectors for forward and backward predictions, and motion vectors for top and bottom fields. The resulting motion information, when decoded with motion information obtained from previous (in raster order) macroblocks, yields the absolute motion vector offset for the current macroblock. By "absolute", it is meant that the motion vector, in terms of its x and y offset, represents the actual pixel offset between the current macroblock and the referenced sub-region on the reference frame. In some cases, the motion vectors obtained from the input bitstream may not be the actual motion vector offset. Rather frequently, the macroblock carries the different between the two absolute motion vectors between this macroblock and the previous one (in raster order). The motion vectors associated with a macroblock is absolute when one of several scenarios arises, such as the macroblock is the first one of the slice, or the previous one is an intra macroblock, or there has been a skipped macroblock, etc. Thus, as one of skill in the art will appreciate, the motion vector information obtained from a macroblock may or may not be the actual vector to be used for motion compensation. In one embodiment, the motion vector is used to derive the actual one.

The motion information is then stored (96) in on-chip memory. In one embodiment, the motion information is stored into a single data structure and labeled. By way of example, the data structure may be stored as a 32 bit word. The data structure may also be packed in an efficient manner such as storing the memory address offsets between the referencing macroblocks and the referenced sub-regions. In other words, the motion information itself is not stored in the array, rather the resulting memory addresses of the referenced sub-region is stored because this is what the motion compensation operation needs. The packing of the 32 bit word can be such that they store only the relative memory offset between a fixed memory location on the reference framestore and the starting address of the referenced sub-region. This way, by initializing the fixed memory location before the motion compensation, the 32 bit word containing the relative offsets for both x and y directions, added to the fixed memory location, yields the full address location of the referenced sub-region.

Cumulatively, all the motion information may be combined in an array for the compressed bitstream and sent to the motion compensation processing task, e.g., and stored on the on-chip memory for the processor that performs motion compensation, which may or may not be the same processor responsible for parsing.

Before motion compensation begins, the motion information is extracted from its stored location. In one embodiment, the motion information includes one or more motion vectors that identify reference sub-regions used for reconstructing referencing macroblocks. A referenced sub-region is located by first obtaining the motion information data array associated with the macroblock about to be reconstructed, extracting the specific shortened memory address offsets and compute the relative offsets in a frame buffer, and moving the reference sub-region from framestore memory to on-chip memory.

In another embodiment, a direct memory access (DMA) is required to obtain a reference sub-region located in off-chip memory and identified by the above motion information data array. In this case, the present invention converts the motion information memory offsets obtained during parsing into specific DMA instructions before motion compensation begins. More specifically, a motion vector is used to determine the relative offsets for a reference sub-region within a reference frame. This information is combined with the reference frame memory address in framestore memory to provide a specific DMA request for obtaining the reference sub-region. The data movement associated with the DMA initiation and transfer from framestore memory to on-chip memory is then handled before motion compensation using the motion vector. In addition, the length of the data transfer and time required to perform the transfer is also estimated in advance to allow the processor to make decisions on when to perform the transfer from framestore memory.

After the DMA transfer to on-chip memory, motion compensation is then performed on its referencing macroblock (99). Since the reference sub-region is already stored in on-chip memory, motion compensation may proceed without waiting for a DMA transfer. Collectively, since the motion vectors for upcoming macroblocks are already known and the DMAs required for reconstructing each macroblock have already been completed, motion compensation may be performed continuously without waiting for DMA transfers for each macroblock in a frame.

Upon completion of motion compensation, the reconstructed macroblock is placed back into a framestore memory using another DMA transfer. In one embodiment, the processor sends a flag indicating that the particular block has been processed. The flag will initiate motion compensation of the subsequent macroblock.

For processing systems using on-chip and off-chip memory sources, avoiding off-chip framestore memory access in this manner may significant increase processing speed. The increase in processing speed may decrease compressed video data processing time—depending on the direct memory access time and the amount and complexity of motion in the video data. For systems required to process multiple bitstreams simultaneously, reduced processing time for recoding a single bitstream may allow additional video bitstreams to be recoded.

Although the present invention has primarily been described so far with respect to a first and faster memory as an on-chip memory source and an off-chip memory source as the framestore memory, the first and framestore memory sources generally refer to any to memory sources in which the framestore memory source has a slower access and/or processing time than the first memory source. For example, the first memory may refer to memory included in a separate chip within the same semiconductor package as the processing chip, while the second memory source is separated from the processor by a PCI bus. Here, the time savings in using the first memory is the time required, but not used, in using the PCI bus that connects the processor to the second memory for each memory access required in motion compensation. Alternatively, multiple caches each designated with a different level according to speed or accessibility may be implemented in a processing system. In this case, a faster or more accessible cache may be used as the first memory source while a larger and/or slower secondary or tertiary cache is used as the framestore memory.

3. Reference Window Motion Compensation

In one embodiment, when a motion vector identifies a reference sub-region for a particular macroblock being processed, the present invention obtains and stores a single reference sub-region for that macroblock only. In another embodiment, the present invention obtains and stores multiple reference sub-regions at a time.

Since motion information and motion vectors for frame 100 are obtained in advance during parsing, knowledge of upcoming macroblocks 102 and their respective motion vectors may be used to intelligently identify which reference sub-regions are needed as processing of frame 100 proceeds. This knowledge allows a processor to selectively obtain multiple reference sub-regions based on upcoming macroblocks 102. For example, three consecutive macroblocks 102 being reconstructed in raster order may identify three adjacent sub-regions in a reference frame. The adjacent sub-regions may then be obtained and stored together to reduce the number of DMAs required for motion compensation of the three consecutive macroblocks 102. Alternately, the three of five macroblocks 102 being reconstructed in raster order may identify three reference sub-regions within a local area of ten reference sub-regions. In this case, all ten reference sub-regions may be obtained and stored onto on-chip memory to reduce memory access required for motion compensation of the three macroblocks 102. Further, if two consecutive macroblocks 102 being reconstructed identify reference sub-regions from disparate portions of the reference frame, each sub-region may be obtained and stored onto on-chip memory one at a time.

Thus, the motion vectors obtained during parsing of the bitstream in advance of motion compensation may be used to make intelligent decisions on memory access as motion compensation proceeds. Decisions based on motion information gained during parsing may include the number of reference sub-regions obtained in a single memory access, which reference sub-regions are obtained in a memory access, and the timing of memory access. In addition, this information can be used to perform the motion compensation operation at a different processor or time, or it may even be that the pre-parsing of motion information is done on a general processor but the actual motion compensation, using the information described, be done on a dedicated ASIC.

Figure 5:
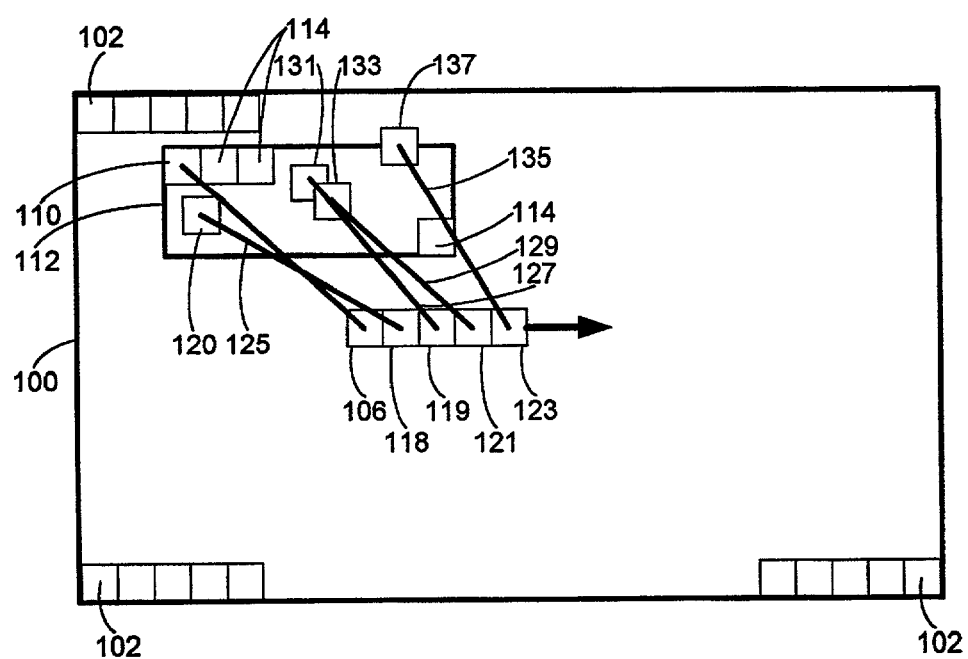
FIG. 5 illustrates a frame being recoded or decoded using a reference window in accordance with one embodiment of the present invention.

In one embodiment, the present invention improves motion compensation by creating and storing a reference window in the on-chip memory. The reference window includes a set of reference window sub-regions. Reference window construction then determines the number of reference sub-regions obtained in a single memory access and which reference sub-regions are obtained in a memory access. FIG. 5 illustrates frame 100 of FIG. 1A being recoded or decoded using a reference window 112 in accordance with one embodiment of the present invention. Motion compensation of macroblocks 102 occurs in raster order. Again, macroblock 106 is the first of five macroblocks currently being processed in raster order.

Reference window 112 is created and stored in the on-chip memory and maintained to improve motion compensation processing speed and on-chip memory usage. Reference window 112 comprises a set of reference window sub-regions 114, each of which is also stored in on-chip memory. The reference window sub-regions 114 each include video data that may be used in re-constructing a macroblock 102. Reference window 112 is a copy of the associated region on the frame buffer.

The set of reference window sub-regions 114 included in reference window 112 are determined using motion information obtained during parsing of the bitstream. Thus, as processing continues to macroblocks 118, 119, 121 and 123, off-chip memory access is avoided by pre-storing sub-regions 114. For example, a motion vector 125 for macroblock 118 identifies reference sub-region 120, which is also stored in on-chip memory via reference window 112 in advance of reconstructing macroblock 118. Similarly, motion vectors 127 and 129 identify reference window sub-regions 131 and 133 for macroblocks 119 and 121, which are also stored in on-chip memory via reference window 112 in advance of reconstructing macroblocks 118 and 121. Thus, the previously acquired motion vectors may be used to identify multiple sub-regions that may be obtained and stored in on-chip memory in a single DMA transfer using reference window 112 to reduce the number of memory accesses required for motion compensation.

At some point during processing, a macroblock 102 may identify a reference sub-region not included in reference window 112. For example, a motion vector 135 for macroblock 123 identifies reference sub-region 137, which is not included within reference window 112. To ensure processing without delays in obtaining reference sub-region 137, reference sub-region 137 is first stored in on-chip memory before motion compensation of macroblock 123.

Figure 6:
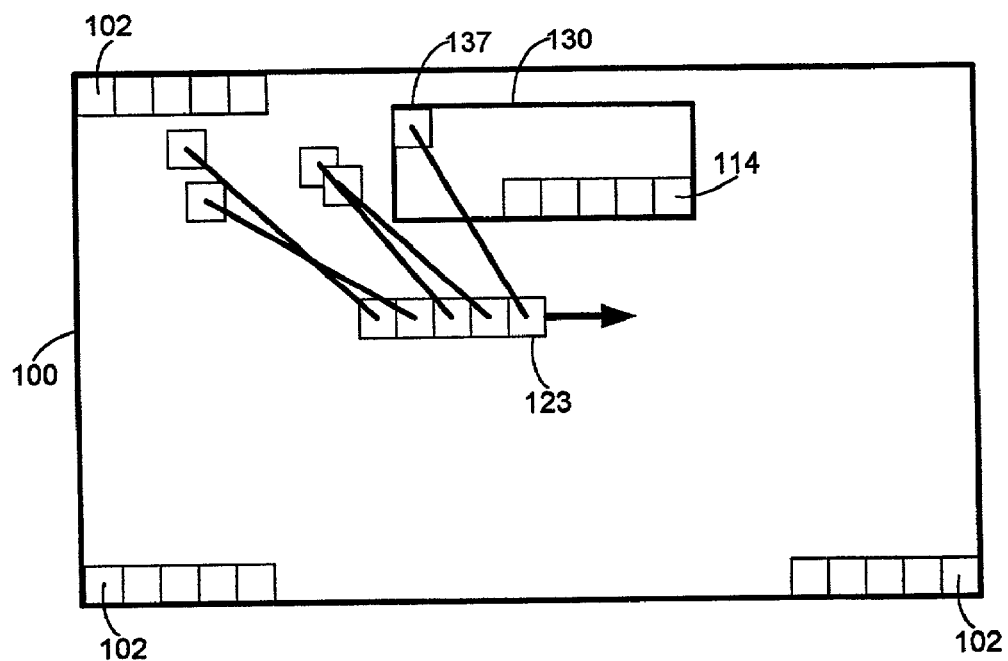
FIG. 6 illustrates the creation of a reference window for the frame of FIG. 5 in accordance with one embodiment of the present invention.

In one embodiment, a new reference window 130 is created using reference sub-region 137 as the upper left reference window sub-region 114 (FIG. 6). All other reference window sub-regions 114 in the new reference window 130 are also stored in on-chip memory, according to the knowledge of which reference sub-regions are required for further processing.

The construction of reference window 112 may vary. In one embodiment, the set of reference window sub-regions 114 included in reference window 112 are determined using motion information and motion vectors obtained during parsing of the bitstream.

In another embodiment, reference window sub-regions 114 included in the new reference window 112 are determined according to the construction of reference window 112. In a specific embodiment, reference window 112 is trapezoidal and reference sub-region 110 is the upper left reference window sub-region 114. This is based on the access parameters of the DMA access, raster order processing of macroblocks in frame 100 and an observation that motion vectors are often similar for adjacent macroblocks 102 in a frame. More specifically, reference window 112 includes a relatively large number of reference sub-regions 114 to the right of reference sub-region 110, which corresponds to the current macroblock 106 being processed. Thus, as re-construction of macroblocks 102 continues in raster order from left to right to macroblocks 118, 119 and 121, the likelihood of encountering a motion vector similar to motion vector 125 is high, and thus the likelihood of encountering a reference sub-region 114 within reference window 112 is high. Reference window 112 also includes several rows of sub-regions 114 below reference sub-region 110. Thus, as re-construction of macroblocks 102 continues in raster order downward in rows, the likelihood of using reference window sub-regions 114 is high, and thus the likelihood of encountering a reference sub-region in on-chip memory, or a "hit", is high.

As shown in FIG. 5, reference window 112 has a rectangular array of reference portions illustrated by a 3×8 array of reference window sub-regions 114. In one embodiment, reference window 112 comprises between about 4 and 128 reference window sub-regions 114. In a specific embodiment, reference window 112 comprises 128 reference window sub-regions in an 1 6×8 rectangular array. In this case, reference window 112 covers a 256×128 pixel region of frame 100. In another specific embodiment, reference window 112 comprises 16 reference window sub-regions 114 in an 8×2 rectangular array. In this case, reference window 112 covers a 128×32 pixel region of frame 100.

In one embodiment, reference window 112 varies in size according to the motion information and motion vectors previously acquired. Thus, if three consecutive macroblocks 102 being reconstructed in raster order identify three adjacent reference sub-regions in a reference frame, reference window 112 is constructed with a 3×1 size to fit the three adjacent sub-regions. Alternately, the three of five macroblocks 102 being reconstructed in raster order identify three reference sub-regions within a local area of ten reference sub-regions, reference window 112 is fit to size to include all ten reference sub-regions.

The motion information may also be used to adapt the size of reference window 112. For example, motion vectors that continually identify reference sub-regions outside of reference window 112 may lead to an excessively large reference window 112 for the on-chip memory. This may be the case for output video having considerable random motion from different portions of the reference frame. Thus, it is sometimes desirable to reduce the number of reference window sub-regions 114 included in reference window 112 when the added performance of a larger reference window 112 would be minimal as determined by the motion vectors previously acquired.

In one embodiment, the timing of reference sub-region storage is such that the reference sub-region is stored into on chip memory just prior to motion compensation of its referencing macroblock. This lead time incorporates the timing required to set up, transfer, and complete a direct memory access to obtain and store the reference sub-region in the on-chip memory. In another specific embodiment, the lead time incorporates an average or estimated time for a processor to reconstruct one macroblock. In general, the timing of reference sub-region storage before and the referencing macroblock reconstruction may vary as long as the reference sub-region is available in on-chip memory when its referencing macroblock is reconstructed. For example, if the time required to locate, obtain, and store a reference sub-region is approximately equal to the time required to reconstruct five macroblocks, the processor may obtain and store reference five or more sub-regions in advance of the macroblocks currently being processed.

In some cases, it may be advantageous to include a buffer in the number of reference sub-regions stored in advance. For example, if the time required to locate, obtain, and store a reference sub-region is approximately equal to the time required to reconstruct five macroblocks, the processor may obtain and store reference ten sub-regions in advance of the macroblocks currently being processed, thus creating a continual processing buffer of five reference sub-regions stored in advance. In a specific embodiment, a predetermined number is used to designate the number of reference sub-regions stored in advance of reconstruction of a referencing macroblock. For example, between about two and about eight reference sub-regions are stored in advance as a continual processing buffer. The timing of reference sub-region storage may vary with processing speed of the processor, the amount of motion and complexity in the video data, the speed of the DMA processor, the speed of the off-chip memory access, or any other parameters which affect the speed of a recoding and motion compensation process etc.

One advantage of the present invention is that motion compensation is separated from subsequent decoding and recoding operations. This effectively separates decoding and recoding dependence on DMA transfers. Since motion compensation is the most computationally expensive process during decoding and recoding, removing dependence on DMA transfers may significantly expedite decoding and recoding operations. In addition, the motion information may be obtained via parsing of the compressed bitstream with almost no additional computational overhead since parsing is currently done on compressed bitstreams.

Obtaining and storing the motion vectors and their associated DMA transfer instructions for reference sub-regions in advance of motion compensation also allows the present invention to decode and recode multiple bitstreams at single time. More specifically, motion compensation can be performed independent of the video bitstream being processed. It is possible to implement a dedicated motion compensation processor such that motion compensations for more than one video program can be performed on the same process. For example, motion compensation may be performed on a macroblock from video program A and then immediately performed on a macroblock from video program B.

Generally, the efficient motion compensation techniques of the present invention may be implemented on software and/or hardware. In a specific embodiment of this invention, the technique of the present invention may be implemented in software such as an operating system or in an application running on an operating system. A software or software/hardware hybrid system of this invention is preferably implemented on a general-purpose programmable machine. Such a programmable machine may be a network device designed to handle network traffic. Such network devices typically have multiple network interfaces. One important class of device that may be used to implement the present invention is the Cable Modem Termination System.

Figure 7:
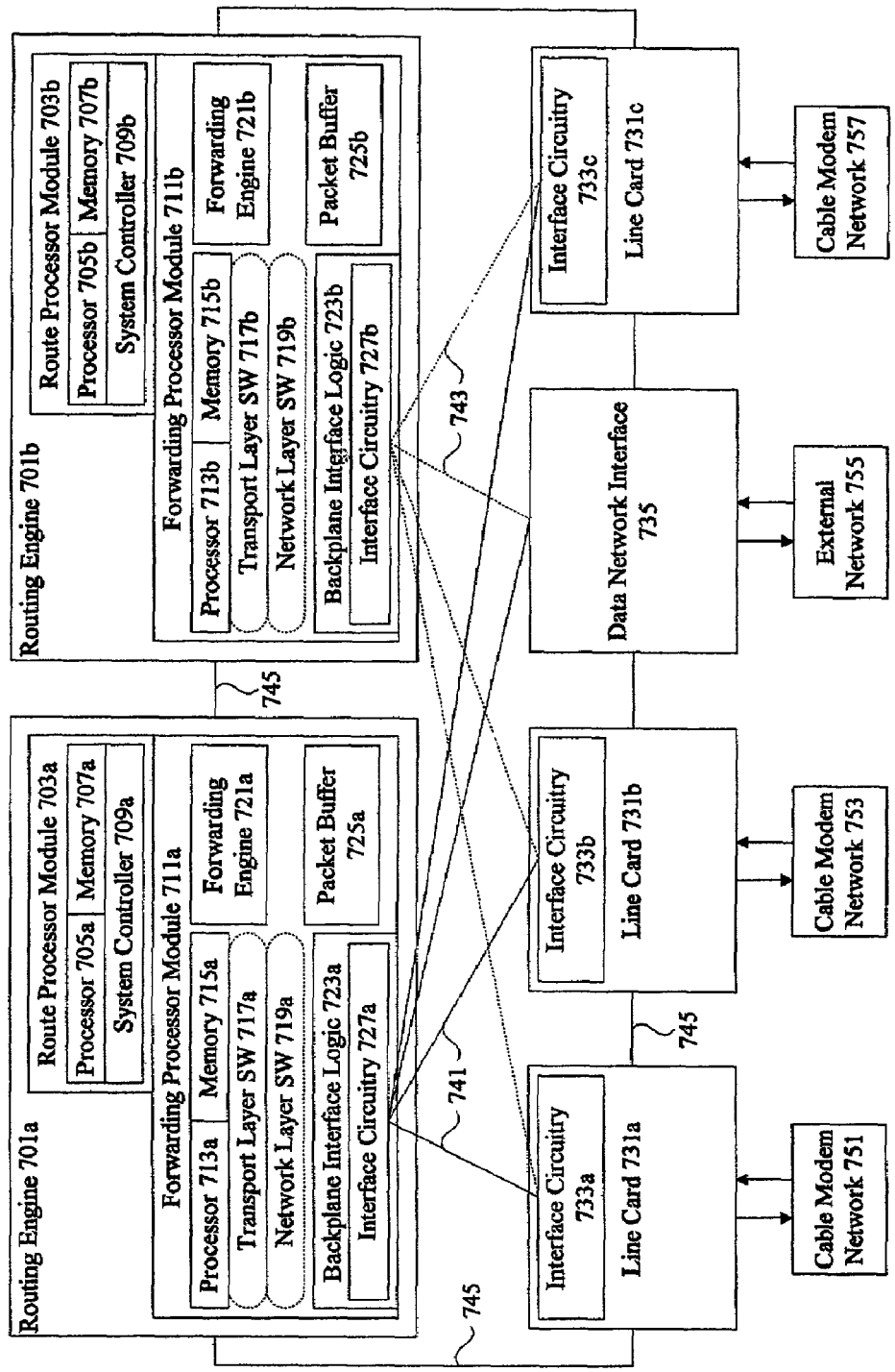
FIG. 7 shows a block diagram of a specific embodiment of a Cable Modem Termination System (CMTS) which may be used to implement certain aspects of the present invention.

FIG. 7 shows a block diagram of a specific embodiment of a Cable Modem Termination System (CMTS) 700 which may be used to implement certain aspects of the present invention. As shown in FIG. 7, the CMTS 700 may comprise a plurality of routing engines (e.g. 701a, 701b).

Each of the routing engines may include a variety of similar modules and/or components. According to a specific embodiment, Routing Engine A may be configured or designed to include a plurality of functionally different modules or components, including, for example, a Forwarding Processor (FP) Module 711a adapted to provide packet forwarding functionality; a Route Processor (RP) Module 703a adapted to implement routing or forwarding operations; a utility component 702a adapted to provide system clock and timestamp functionality; etc. The routing engine components provide may be configured to provide layer one, layer two, layer three and layer four functionality as well as quality of service (QoS) functionality.

According to a specific implementation, the RP Module 703a may be configured as a processor-based routing system comprising functionality incorporated within a typical router, such as, for example, specially configured router models 1600, 2500, 2600, 3600, 4500, 4700, 7200, 7500, 10012, and 12000 available from Cisco Systems, Inc. of San Jose, Calif. For example, as shown in the embodiment of FIG. 7, the RP Module 703a comprises a general-purpose processor 705a (e.g., a MIPS route processor) coupled to a system controller 709a and memory 707a.

The memory 707a may comprise synchronous dynamic random access memory (SDRAM) storage locations addressable by the processor 705a for storing software programs, video data, and data structures accessed by the components. A network routing operating system, portions of which may reside in memory and executed by the route processor, functionally organizes the router by invoking network operations in support of software processes executing on the router.

The RP processor 705a may be configured to construct and load routing tables used by the FP Module 711a. The processor 705a may also be configured or designed to perform configuration management functions of the routing engine 701a, and to communicate with neighboring peer, standby, and/or backup routers to exchange protocol data units used to construct the routing tables in accordance with conventional routing algorithms. It will be apparent to those skilled in the art that other memory types, including various computer readable media, may be used for storing and executing program instructions pertaining to the operation of the routing engine.

Interface circuitry 727a may be coupled to the respective interface circuitry 733a, 733b of line cards 731a, 731b. According to various embodiments, the FP Module 711 may comprise a processor 713a and memory 715a for handling transport layer 717 and network layer 719 functionality. The FP Module 711a may also be configured to provide transaction compacting functionality, data parcel tunneling functionality, video data transmission functionality, etc.

According to different embodiments of the present invention, one or more of the routing engines may be configured to communicate with a plurality of line cards (e.g. 731, 735) via point-to-point links. For example, as shown in FIG. 7, each of the plurality of line cards 731 and 735 are connected to each of the routing engines 701a, 701b via point-to-point links 741 and 743. One advantage of the point-to-point link configuration is that it provides additional reliability in that the failure of one or more line cards will not interfere with communications between other line cards and the routing engine(s). For example, if Line Card A 731a suddenly failed, each of the routing engines would still be able to communicate with the other line cards.

The efficient motion compensation techniques of the present invention may be implemented on various general purpose Cable Modem Termination Systems. In a specific embodiment, the systems of this invention may be specially configured CMTSs such as, for example, specially configured models in the uBR-7200 and uBR-10012 series of CMTSs available from Cisco Systems, Inc. of San Jose, Calif. In an alternative embodiment, the methods of this invention may be implemented on a general-purpose network host machine such as a personal computer or workstation. Further, the invention may be at least partially implemented on a card (e.g., an interface card) for a network device or a general-purpose computing device.

Regardless of network device's configuration, it may employ one or more memories or memory modules (e.g., memory 707a, 715a, etc.) configured to store video data, program instructions for the network operations and other functions of the present invention described herein. The program instructions may specify an operating system and one or more applications, for example. Such memory or memories may also be configured to store data structures, video data, or other specific non-program information described herein.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks;

magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

While the discussion to this point has focused on efficient motion compensation techniques for cable networks, the technology of the present invention may be applied to any access or shared-access network having a plurality of hosts or nodes which share at least one channel for communicating with at least one Head End in the network. Examples of shared-access networks include, in addition to cable networks, wireless networks, Ethernet, FastEthernet, GigabitEthernet, LANs, etc. In the cable network, the plurality of nodes represents a plurality of cable modems that communicate with at least one CMTS at the centralized termination system using at least one shared-access upstream and downstream channel.

In general, the methods and apparatus described above may be implemented on a traffic handling device (e.g., a switch or router) for providing efficient motion compensation capability in a network having at least one traffic handling device (e.g., another switch or router) that provides normal service to a host.

While this invention has been described in terms of several preferred embodiments, there are alterations, permutations, and equivalents which fall within the scope of this invention which have been omitted for brevity's sake. It is therefore intended that the scope of the invention should be determined with reference to the appended claims.

The invention claimed is:

1. A method for processing a compressed bitstream comprising video data, the method comprising:
    parsing a portion of the compressed bitstream before motion compensation on video data included in the portion;
    obtaining motion information related to the video data, the motion information comprising a set of motion vectors;
    identifying a reference sub-region based on at least the motion information;
    creating a reference window that includes a set of reference window sub-regions, where the reference sub-region is the upper left reference window sub-region in the reference window;
    storing the reference sub-region identified by the motion information and storing the reference window in an on-chip memory before performing motion compensation using the set of motion vectors, wherein a time that the reference sub-region and reference window is stored in the on-chip memory before performing motion compensation using the set of motion vectors comprises an estimated time to reconstruct one macroblock; and
    performing motion compensation on the video data in raster order and using the reference sub-region stored on the on-chip memory.

2. The method of claim 1 further comprising retrieving the reference sub-region identified by the motion information from an off-chip memory separated from the on-chip memory by a bus.

3. The method of claim 2 wherein retrieving the reference sub-region comprises performing a direct memory access in an off-chip memory source based on the motion vector.

4. The method of claim 3 wherein the direct memory access includes accessing the off-chip memory source.

5. The method of claim 1 further comprising storing the motion information in the on-chip memory.

6. The method of claim 1 wherein obtaining motion information comprises extracting and decoding the set of motion vectors from the compressed bitstream.

7. The method of claim 1 wherein the time that the reference sub-region is stored in the on-chip memory before performing motion compensation using the set of motion vectors comprises the time required to complete a direct memory access to store the reference sub-region in the on-chip memory.

8. The method of claim 1 wherein the timing of reference sub-region storage varies with the amount of motion and complexity in the video data.

9. The method of claim 1 wherein storing the reference sub-region further comprises storing multiple reference sub-regions.

10. The method of claim 9 wherein the multiple reference sub-regions are included in a reference window, the reference window comprising a set of reference window sub-regions.

11. The method of claim 10 wherein the timing of reference sub-region storage varies with processing speed of a processor that performs the motion compensation.

12. The method of claim 11 wherein the reference window has a trapezoidal array of reference window portions.

13. The method of claim 12 wherein the reference window comprises between about 4 and 128 reference window sub-regions.

14. The method of claim 1 wherein the video data comprises a macroblock.

15. The method of claim 1 further comprising converting the motion information to an DMA instruction.

16. The method of claim 1 further comprising obtaining motion information from a second compressed bitstream and performing motion compensation on video data included in the second compressed bitstream.

17. A method for processing a compressed bitstream comprising video data, the method comprising:
    parsing a portion of the compressed bitstream before motion compensation on video data included in the portion;
    obtaining motion information related to the video data, the motion information comprising a set of motion vectors;
    identifying a set of reference window sub-regions based on at least the motion information;
    creating a reference window that includes the set of reference window sub-regions identified by the motion information, where the reference window includes more reference sub-regions than a number of reference sub-regions identified by the motion information;
    storing the reference window sub-regions included in a reference window in an on-chip memory before motion compensation using the motion information, wherein a time that the reference sub-region and reference window is stored in the on-chip memory before performing motion compensation using the set of motion vectors comprises an estimated time to reconstruct one macroblock, and wherein the set of motion vectors references a reference window sub-region in the set of reference window sub-regions; and performing motion compensation on the video data using the reference sub-region stored on the on-chip memory.

18. The method of claim 17 wherein the timing of reference sub-region storage varies with the amount of motion and complexity in the video data.

19. The method of claim 17 wherein the reference window has a trapezoidal array of reference window sub-regions.

20. The method of claim 17 the reference sub-region identified by the motion information is the upper left reference window sub-region in the reference window.

21. A system for processing a compressed bitstream comprising video data, the system comprising:
   means for parsing a portion of the compressed bitstream before motion compensation on video data included in the portion;
   means for obtaining motion information related to the video data, the motion information comprising a set of motion vectors;
   means for identifying a reference sub-region based on at least the motion information;
   means for creating a reference window that includes a set of reference window sub-regions, where the reference sub-region is the upper left reference window sub-region in the reference window;
   means for storing the reference sub-region identified by the motion information in an on-chip memory before performing motion compensation using the set of motion vectors, wherein a time that the reference sub-region and reference window is stored in the on-chip memory before performing motion compensation using the set of motion vectors comprises an estimated time to reconstruct one macroblock; and
   means for performing motion compensation on the video data in raster order and using the reference sub-region stored on the on-chip memory.

22. The method of claim 21 further comprising means for extracting and decoding the motion information from the compressed bitstream.

23. The method of claim 21 further comprising means for creating a reference window comprising the set of reference window sub-regions, the set of reference window sub-regions including the reference sub-region identified by the motion information.

24. A computer readable medium including instructions for processing a compressed bitstream comprising video data, the instructions comprising:
   instructions for parsing a portion of the compressed bitstream before motion compensation on video data included in the portion;
   instructions for obtaining motion information related to the video data, the motion information comprising a set of motion vectors;
   instructions for identifying a reference sub-region based on at least the motion information;
   instructions for creating a reference window that includes a set of reference window sub-regions, where the reference sub-region is the upper left reference window sub-region in the reference window;
   instructions for storing the reference sub-region identified by the motion information and storing the reference window in an on-chip memory before performing motion compensation using the set of motion vectors, wherein a time that the reference sub-region and reference window is stored in the on-chip memory before performing motion compensation using the set of motion vectors comprises an estimated time to reconstruct one macroblock; and
   instructions for performing motion compensation on the video data in raster order and using the reference sub-region stored on the on-chip memory.

25. The computer readable medium of claim 24, wherein the on-chip memory forms a part of a processor, and the processor is configured to perform the motion compensation.

26. The computer readable medium of claim 25, wherein the reference sub-region identified by the motion information is retrieved from an off-chip memory across a bus.

27. A method for processing a compressed bitstream comprising video data, the method comprising:
   parsing a portion of the compressed bitstream before motion compensation on video data included in the portion;
   obtaining motion information related to the video data, the motion information comprising a set of motion vectors;
   identifying a reference sub-region based on at least the motion information;
   creating a reference window that includes a set of reference window sub-regions, where the reference sub-region is the upper left reference window sub-region in the reference window;
   retrieving the set of reference window sub-regions from a first memory;
   storing the reference sub-region identified by the motion information in a second memory before performing motion compensation using the set of motion vectors, wherein a time that the reference sub-region and reference window is stored in the second memory before performing motion compensation using the set of motion vectors comprises an estimated time to reconstruct one macroblock; and
   performing motion compensation on the video data in raster order using the reference sub-region stored on the first memory.

28. The method of claim 27 wherein the second memory source is an on-chip memory source.

29. The method of claim 27 wherein retrieving the reference sub-region comprises performing a direct memory access in the first memory source based on the motion vector.

30. The method of claim 29 wherein the first memory source is an off-chip memory source and the direct memory access includes accessing the first memory source.

31. A system for processing a compressed bitstream comprising video data, the system comprising:
   a processor configured to
      parse a portion of the compressed bitstream before motion compensation on video data included in the portion,
      obtain motion information related to the video data, the motion information comprising a set of motion vectors,
      identify a reference sub-region based on the motion information;
      create a reference window that includes a set of reference window sub-regions, where the reference sub-region is the upper left reference window sub-region in the reference window, and
      perform motion compensation on the video data in raster order and using the reference sub-region; and a first memory that stores the reference sub-region identified by the motion information and stores the reference window before the processor performs motion compensation using the set of motion vectors, wherein the first memory stores the reference sub-region and reference window before performing motion compensation using the set of motion vectors by a time that comprises an estimated time to reconstruct one macroblock.

32. The system of claim 31 further comprising a second memory that has a slower access time than the first memory for the processor and that stores the reference sub-region identified by the motion information.

33. The system of claim 32 wherein the second memory is separated from the processor by a bus.

34. The system of claim 32 wherein the second memory requires a direct memory access to retrieve the reference sub-region identified by the motion information.

35. The system of claim 31 wherein the time that the reference sub-region is stored in the first memory before performing motion compensation using the set of motion vectors further comprises the time required to complete a direct memory access to store the reference sub-region in the first memory.

36. The system of claim 31 wherein the timing of reference sub-region storage varies with processing speed of the processor.

37. The system of claim 31 wherein the video data comprises a macroblock.

38. The system of claim 31 further comprising an interface that controls the sending and receiving of data packets over a network.

39. The system of claim 31 wherein the first memory forms a part of the processor.

40. The system of claim 31 wherein the system is included in a routing engine.

41. A system for processing a compressed bitstream comprising video data, the system comprising:
a processor configured to
parse a portion of the compressed bitstream before motion compensation on video data included in the portion,
obtain motion information related to the video data, the motion information comprising a set of motion vectors,
identify a set of reference sub-regions using the motion information;
create a reference window that includes the set of reference window sub-regions identified by the motion information, where the reference window includes more reference sub-regions than a number of reference sub-regions identified by the motion information, and
perform motion compensation on the video data using the reference sub-region; and
a first memory that stores the reference sub-region identified by the motion information and stores the reference window before the processor performs motion compensation using the set of motion vectors, wherein the first memory stores the reference sub-region and reference window before performing motion compensation using the set of motion vectors by a time that comprises an estimated time to reconstruct one macroblock.

42. The system of claim 41 further comprising a second memory that has a slower access time than the first memory and that stores the reference sub-region identified by the motion information.

43. The system of claim 42 wherein the second memory is separated from the processor by a bus.

44. The system of claim 42 wherein the second memory requires a direct memory access to retrieve the set of reference window sub-regions identified by the motion information.

45. The system of claim 41 wherein the time that the set of reference window sub-regions is stored in the first memory before performing motion compensation using the set of motion vectors further comprises the time required to complete a direct memory access to store the set of reference window sub-regions in the first memory.

46. The system of claim 41 wherein the timing of reference sub-region storage varies with processing speed of the processor.

47. The system of claim 41 wherein the video data comprises a macroblock.

48. The system of claim 41 further comprising an interface that controls the sending and receiving of data packets over a network.

49. The system of claim 41 wherein the first memory forms a part of the processor.

50. The system of claim 41 wherein the system is included in a routing engine.

* * * * *